United States Patent [19]
Graham et al.

[11] 4,365,988
[45] Dec. 28, 1982

[54] FLUID-MIXING APPARATUS AND METHOD

[75] Inventors: J. Clifford Graham, Lafayette; Shelby W. Gallien, West Lafayette, both of Ind.; Maurice P. Gill, Watseka, Ill.

[73] Assignee: 3G Corporation, West Lafayette, Ind.

[21] Appl. No.: 214,013

[22] Filed: Dec. 8, 1980

[51] Int. Cl.³ .............................. C05B 7/00; B01F 7/26
[52] U.S. Cl. .......................................... 71/34; 71/64.1; 71/43; 366/137; 366/168; 366/317
[58] Field of Search ............... 366/168, 171, 172, 167, 366/179, 174, 137, 136, 317; 71/34, 43, 64.1; 422/225

[56] References Cited

U.S. PATENT DOCUMENTS

| | | | |
|---|---|---|---|
| 2,520,957 | 9/1950 | Peterson | 366/172 |
| 2,701,193 | 2/1955 | Heudier | 422/225 |
| 2,868,516 | 1/1959 | Moseley | 366/167 |
| 2,950,171 | 8/1960 | Maco | 422/225 |
| 3,322,505 | 5/1967 | Weber | 422/225 |
| 3,421,879 | 1/1969 | Funk | 71/43 |

Primary Examiner—Robert W. Jenkins
Attorney, Agent, or Firm—Jenkins, Coffey, Hyland, Badger & Conard

[57] ABSTRACT

A body of liquid, such as an aqueous fertilizer mixture, in a tank is stirred and mixed by apparatus which produces a pattern of recirculating flow including a zone of rapid streamline flow in the tank, preferably an upwardly diverging conical pattern and preferably at an eccentric point in the tank. An addition component in fluid state, such as anhydrous liquid ammonia, is injected into the rapidly flowing liquid in a plurality of fine streams from a stationary injection manifold so as to produce an intimate dispersion of finely divided addition fluid at spaced points in the mixture which is immediately carried away from the injection area and widely dispersed in the liquid mixture. When anhydrous ammonia is thus dispersed in a fertilizer mixture containing a suitable reactant, such as phosphoric acid ($H_3PO_4$), the heat of vaporization of the finely dispersed ammonia is uniformly absorbed throughout the mixture, and there is a simultaneous exothermic reaction between the dispersed ammonia and the reactant which supplies heat to offset partially or wholly the heat loss produced by the vaporization. The overall reaction proceeds smoothly and quietly to produce a stable reaction mixture.

24 Claims, 4 Drawing Figures

FLUID-MIXING APPARATUS AND METHOD

This invention relates to a method and apparatus for intimately mixing a fluid with a liquid, and especially for mixing liquid ammonia with an aqueous fertilizer mixture to add nitrogen to such mixture.

Liquid ammonia has been added to aqueous fertilizer mixtures in various ways. One of the commonly used ways is by recirculating the aqueous mixture from a tank through a pump and back to the tank through a mixing tube where liquid ammonia is injected into the stream and where the ammonia vaporizes and reacts with other components of the aqueous fertilizer mixture. Such procedure is often unsatisfactory and unreliable. Incomplete and uneven mixing of the ammonia with the aqueous mixture occurs and the overall reaction does not proceed smoothly. The reaction may cause violent and even explosive agitation in the mixing tube and tank, and the ammonia is not completely taken up in the solution and gaseous ammonia may escape, so that there is a loss of ammonia and pollution of the surrounding environment, and so that the content of the resulting mixture is uncertain. Various other situations exist where similar mixing and dispersion problems occur. The present invention produces a highly uniform and intimate mixing of the added ammonia, with more thorough and more finely divided dispersion of the ammonia throughout the reaction mixture, and the process proceeds smoothly and quietly, without violent localized agitation, and the ammonia is completely taken up so as to produce a stable mixture of known content.

In accordance with the invention, a tank containing a body of liquid mixture is provided with means to produce stirring and mixing of the liquid and a localized zone of rapid streamline flow of the liquid in the tank, preferably an upwardly diverging conical flow and preferably at an eccentric point in the tank. A stationary injection manifold, preferably a ring in the case of such conical flow, is provided to inject into the smooth flowing liquid a plurality of fine streams of fluid additive, such as liquid ammonia, so as to produce an intimate mixing and dispersion of finely divided additive fluid in the flowing liquid, which is then carried away with the flow and mixed throughout the reaction mixture. For more thorough mixing, the mixture may be simultaneously recirculated from the tank through a pump and back into the tank. The invention is especially useful for mixing anhydrous liquid ammonia into an aqueous fertilizer mixture containing a component which reacts with the ammonia, and in such case the ammonia is dispersed in finely divided state widely throughout the flowing liquid where it vaporizes and the heat of vaporization is absorbed uniformly and completely throughout the dispersion and where the widely dispersed ammonia reacts in the fertilizer mixture to produce an exothermic reaction which supplies heat to at least partially offset the heat loss produced by the vaporization, and does so uniformly throughout a large body of reaction mixture, so that the overall reaction occurs smoothly without excessive agitation from the reaction and quickly produces a stable reaction product.

The accompanying drawings illustrate the invention and show a preferred embodiment exemplifying the best mode of carrying out the invention as presently contemplated. In such drawings.

Figure 1:
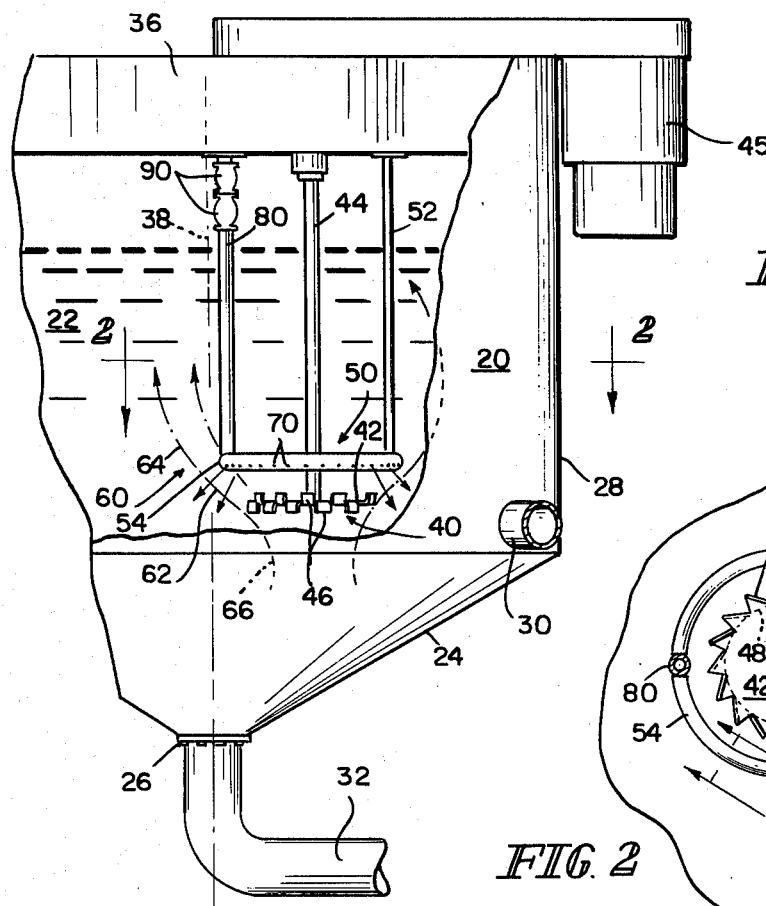
FIG. 1 is a vertical section of a tank containing mixing apparatus in accordance with the invention.

For illustration purposes, the present invention will be described in an application for mixing and dispersing anhydrous ammonia ($NH_3$) in an aqueous fertilizer mixture containing a reactant such as phosphoric acid ($H_3PO_4$) which reacts with the anhydrous ammonia in an exothermic reaction, in a manner such that the overall reaction proceeds smoothly and quietly to produce a stable fertilizer product. A typical fertilizer mixture will include a slurry of water, a clay such as attapulgite, mono-ammonium phosphate, and potash. When the mono-ammonium phosphate is mixed with the water, phosphoric acid ($H_3PO_4$) is formed, and anhydrous ammonia is injected into the mixture and reacts with the phosphoric acid in an exothermic action to produce a stable fertilizer product. It should be understood that while the present invention is described in an application for producing a fertilizer product, the apparatus and method according to the invention may also be used for dispersing and mixing other fluids in a liquid to produce other liquid products.

The apparatus shown in the drawings comprises a cylindrical stainless steel tank or mixing vessel 20 having, for example, an outside diameter of ninety inches (228.60 cm), for containing a body of liquid 22, such as an aqueous fertilizer mixture comprising water, attapulgus clay, and mono-ammonium phosphate. The cylindrical tank 20 has a frustoconical bottom 24 which includes an outlet port 26 for draining the liquid 22 from the tank 20. The tank 20 also has a circumferential side 28 which includes an inlet port 30 for introducing liquid 22 into the tank 20 in a tangential direction, as indicated by the arrow in FIG. 2. The outlet port 26 and inlet port 30 are interconnected by a drain pipe 32 and a pump 34, shown in FIG. 4, for recirculating the liquid 22 from the tank 20 and back into the tank 20. While other conventional pumps 34 may be used, a single throat centrifugal pump of the type manufactured by Labour Corporation of Elkhart, Ind., has been found to be suitable for recirculating the liquid 22.

Dispersing and mixing means is mounted within the tank 20 and is conveniently supported from a top cover 36. Such dispersing and mixing means is positioned below the top cover 36 of the tank 20 at a location eccentric to the central axis 38 of the tank 20, and comprises a rotatable impeller 40 for agitating the liquid 22 at a high rate of speed to produce flow action in the liquid 22. While other impellers may produce the advantageous results of the present invention, optimum results have been achieved by using an impeller manufactured by Shar Dispersion Equipment Company, Inc., of Ft. Wayne, Ind., which is disclosed in U.S. Pat. No. 3,044,750. In view of the optimum results produced by such impeller, the description of the impeller in U.S. Pat. No. 3,044,750 is hereby incorporated by reference and made a part of the description of the present invention.

Figure 2:
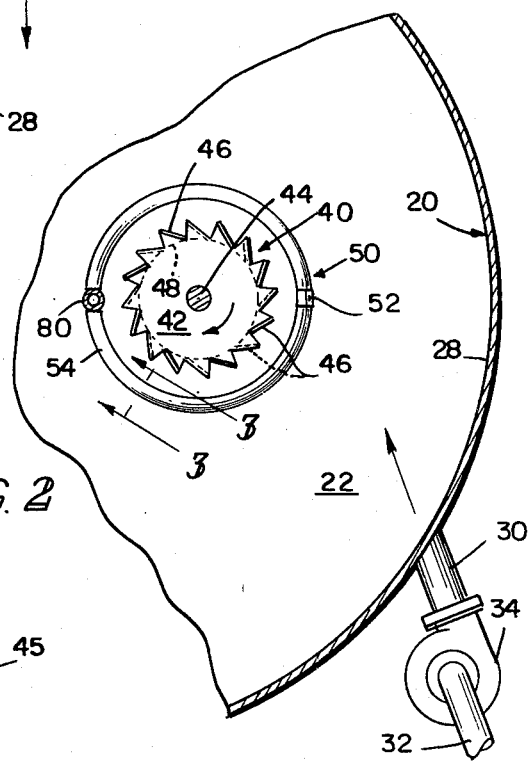
FIG. 2 is a section on the line 2—2 of FIG. 1, showing the relationship of the mixing impeller and the dispersion-injection manifold.

The impeller 40 generally includes a circular disk 42 having, for example, a diameter of eighteen inches (45.72 cm). The disk 42 includes means for concentrically attaching the disk 42 to a shaft 44 rotatably supported from the top 36 of the tank 20 and extending downward into the tank 20. The shaft 44 has its distal end connected to suitable means 45 for driving the impeller 40 for rotation in a predetermined direction, such as, for example, in a clockwise direction as indicated by the arrow in FIG. 2. Projecting at generally right angles to the plane of the circular disk 42 and evenly spaced around the disk 42 adjacent its outer periphery are a plurality of elongated impelling vanes 46. Each vane 46 has its leading edge coincident with a circle 48 concentric with the shaft 44 and inclined outwardly and rearwardly therefrom, as best shown in FIG. 2. For optimum results, it has been found that the ratio of the mixing vessel 20 diameter to the impeller disk 42 diameter is desirably five to one (5:1), that is the mixing vessel 20 diameter should be five times greater than the impeller disk 42 diameter. It has also been found that for optimum results in dispersing and mixing anhydrous ammonia in a liquid fertilizer mixture, the tip speed of the impeller 40 should be at least five thousand feet per minute (15,240 decimeters/min.).

Also positioned axially downward from the top 36 of the tank 20 and concentric with the impeller 40 and shaft 44 is a stationary fluid-injection manifold 50 which preferably is a circular ring having an outside diameter of twenty-four inches (60.96 cm). The fluid-injection manifold 50 is supported above the impeller 40 in a spaced parallel relationship therewith by a feed pipe 80 and a stabilizing support rod 52 which are mounted to the cover 36 of the tank 20 and extend axially downward therefrom.

The fluid-injection manifold 50 is provided with a plurality of angularly spaced injection orifices 70 in a 360° pattern, for injecting into the liquid 22 flowing past it a plurality of fine streams of the fluid to be mixed with such liquid. These injection orifices 70 are provided at an angle 72 relative to the horizontal plane 74 of the injection manifold 50 so that fluid is injected at a right angle to the liquid flow direction to produce an intimate dispersion of finely divided fluid at spaced points in the liquid 22. The angle 72 which is used may vary as the diameter of the mixing tank 20 and the diameter of the impeller 40 are increased or decreased.

Figure 4:
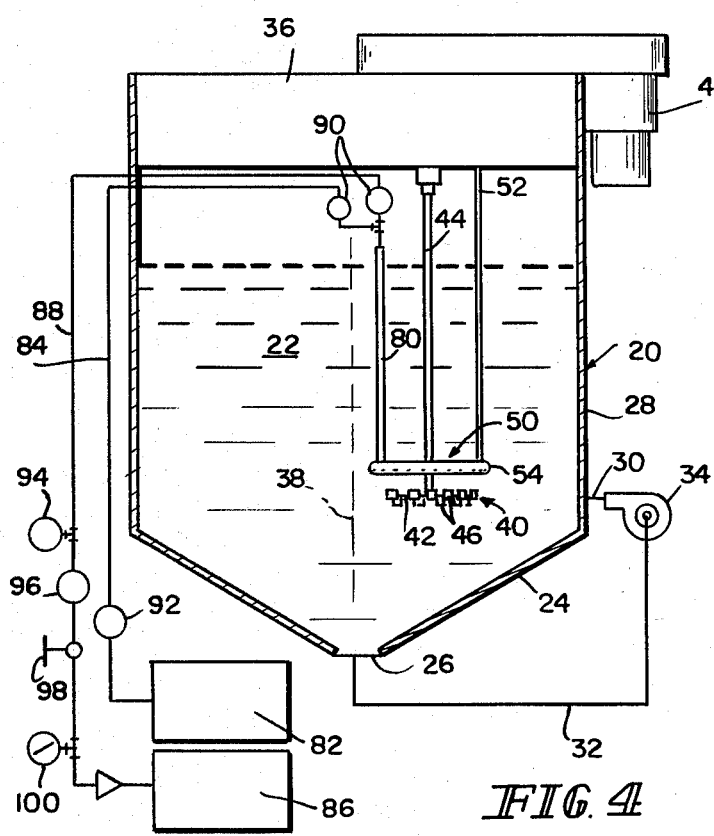
FIG. 4 is a diagram of a system including a tank as shown in FIG. 1 and accessory devices used therewith.
Figure 3:
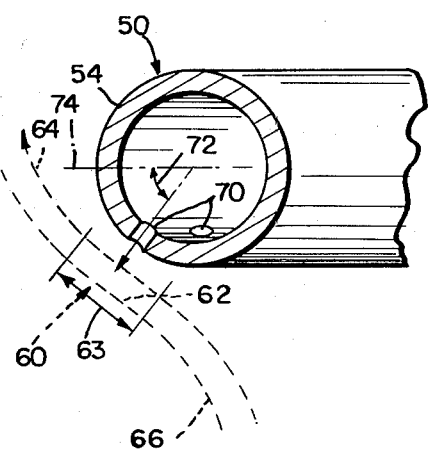
FIG. 3 is a section on the line 3—3 of FIGS. 1 and 2, showing a cross section of the injection manifold.

Referring now more particularly to FIG. 4, the fluid to be injected by the fluid-injection manifold 50 is supplied to the manifold 50 by the supply pipe 80 which extends axially upward from the manifold 50 in the tank above the surface level of the liquid 22. The supply pipe 80 is connected to a source 82 of water ($H_2O$) by a supply line 84 and is also connected to a source 86 of fluid, such as anhydrous ammonia ($NH_3$), by a supply line 88. Included within each of the supply lines 84, 88 is a back flow check valve 90. The water supply line 84 includes a globe valve 92 for regulating the flow of the water. The fluid supply line 88 includes a pressure gauge 94, a globe valve 96 for regulating the flow of fluid in the supply line 88, a Y-type strainer 98, and a pressure-relief valve 100. While there are many sources for the valves used in the supply lines 84, 88, suitable globe valves may be obtained from Squibb-Taylor of Dallas, Tex.

In operation, the impeller 40 produces a continuous circulation of the liquid 22 in a flow pattern which includes an upwardly diverging generally conical flow stream 60 past and in proximity to the outer peripheral boundary 54 of the fluid-injection manifold 50. In the area immediately adjacent the manifold, there is a rapidly moving liquid flow zone 62 wherein the liquid moves in a smooth streamline flow substantially without turbulence through a length 63 in a direction generally tangent to the arcuate outer periphery boundary 54 of the circular fluid-injection manifold 50. In general, this zone of streamline flow 62 may be referred to as a laminar flow pattern. The recirculation flow produced by the impeller 40 and injection manifold 50 may also include a turbulent liquid flow pattern 64 in the liquid flow stream 60 generally above the injection manifold 50 and a vortex may be created both above and below the impeller 40 all of which aids in thoroughly mixing the recirculating mixture.

In the illustrative application for dispersing and mixing anhydrous ammonia in a liquid fertilizer mixture, the injection of fine streams of anhydrous ammonia in the rapidly moving streamline liquid flow zone 62 at a suitable angle produces good dispersion of finally divided quantities of stable ammonia in the fertilizer mixture so as to distribute both the evaporation of the anhydrous ammonia and the reaction between the anhydrous ammonia and the reactant, phosphoric acid, throughout such fertilizer mixture. This advantageous result will be explained in more detail later in a specific example of the production of a liquid fertilizer product using the apparatus of the present invention.

An example of the use of the apparatus described above for producing a 200-pound liquid batch of 3-10-30 fertilizer which contains a plant food value of forty-three units, using the apparatus of the present invention is as follows. By definition, the term "plant food" includes nitrogen, phosphorous, and potassium, and one unit is generally equal to twenty pounds (21.072 kg.) of plant food. In other words, in a 2,000-pound (907.20 kg.) batch of 3-10-30 liquid fertilizer, there is sixty pounds (27.216 kg.) of nitrogen, 200 pounds (210.72 kg.) of phosphorous, and 600 pounds (272.16 kg.) of potassium.

Initially, 66.54 gallons (251.87 liters) or 555 pounds (251.748 kg.) of water ($H_2O$) is added to the mixing tank 20. At the start of the mixing cycle, the water will have a temperature of generally 60° F. (15.55° C.). Next, twenty pounds (21.072 kg.) of clay, such as, for example, attapulgite, is added to the water. While it has been found advantageous to use attapulgus clay, other clays having similar properties may also be used. The clay should have a high chemical inertness so that electrolytes such as ammonia, sodium hydroxide, potassium chloride, and inorganic phosphates have relatively little effect upon the clay. The liquid mixture comprised of the water and clay is agitated in the mixing tank 20 by the impeller 40 to produce the upwardly diverging, generally conical liquid flow stream 60 which includes the rapidly moving streamline liquid flow zone 62 in proximity to the fluid-injection manifold 50 and a turbulent liquid flow pattern 64 generally above the fluid-injection manifold 50. These liquid flow patterns 62, 64 are employed to disperse and widely mix anhydrous ammonia ($NH_3$) into the liquid mixture 22.

The next step is to add 400 pounds (181.44 kg.) of mono-ammonium phosphate to the liquid mixture 22. The mono-ammonium phosphate, for example, has an analysis of 10-50-0, which means that it includes ten units of ammonium ($NH_4$), fifty units of phosphoric pentoxide ($P_2H_5$), and zero units of potassium sulfate or potassium chloride ($K_2O$). The mono-ammonium phosphate is mixed into the liquid mixture 22 in granular form. When the water and mono-ammonium phosphate are mixed together, phosphoric acid ($H_3PO_4$) is formed.

In the next step, anhydrous ammonia in its liquid state is injected from the fluid-injection manifold 50 in a plurality of fine streams into the liquid mixture 22 generally perpendicular to the streamline liquid flow pattern 62, to produce an intimate dispersion of finely divided anhydrous ammonia at spaced points in the liquid mixture 22. In the mixture, the ammonia vaporizes in an endothermic action, and the heat of vaporization of the finely dispersed ammonia is uniformly drawn from throughout the liquid mixture 22 and the ammonia goes into solution so that there is no release of volatile ammonia gases into the atmosphere. A corresponding heat loss in the liquid mixture 22 is therefore produced by the vaporization of the anhydrous ammonia. However, when the anhydrous ammonia is added to the liquid mixture 22, it reacts with the phosphoric acid to produce mono-ammonium phosphate in an exothermic action which adds heat throughout to the mixture to more than offset the heat loss produced by the vaporization of the anhydrous ammonia. As a result, in this example, the temperature of the liquid mixture 22 rises to 120° F. (48.88° C.) to 130° F. (54.44° C.). At these temperatures, the mono-ammonium phosphate becomes soluble in the liquid mixture 22 and goes into solution in the liquid mixture 22. This overall reaction proceeds smoothly and quietly to substantially eliminate the evolution of anhydrous ammonia gases out of the liquid mixture 22 into the atmosphere.

Desirably, the liquid mixture 22 is continuously recirculated out of the mixing tank 20 and introduced back into the mixing tank 20 in a direction tangential to and opposed to the direction of rotation of the impeller 40, as indicated in FIG. 2. The liquid mixture 22 is introduced into the mixing tank 20 at a point which is generally on the same level as, or below, the impeller 40 so that the liquid is again agitated by the impeller 40. The rotation of the impeller 40 in an direction opposite to the introduction of the liquid mixture 22 through the inlet port 30 produces a homogeneous particle suspension in the liquid mixture 22.

In the final step, 1,000 pounds (453.60 kg.) of potassium sulphate or potassium chloride ($K_2O$) is added to the mixture and mixed for approximately five minutes, or until it dissolves in the liquid mixture 22. This produces 2,000 pounds (907.20 kg.) of a final liquid fertilizer product which includes forty-three units of plant food, and the mixing of the fertilizer product is accomplished in a very safe and orderly manner using the apparatus of the present invention.

What is claimed is:

1. A method of uniformly mixing and dispersing a volatile first liquid in a second liquid, comprising the steps of providing a body of the second liquid in a container, creating in the body of second liquid a recirculating flow pattern including a zone of rapid directional liquid flow, injecting into the rapid liquid flow zone a plurality of fine streams of the volatile first liquid to be mixed with the second liquid so as to produce an intimate dispersion of finely divided volatile first liquid at spaced points in the second liquid, and carrying the resulting dispersion into the recirculating flow pattern to widely mix the dispersed volatile first liquid throughout the second liquid in the container.

2. The method of claim 1 wherein the recirculating liquid flow pattern and the rapid directional flow zone are created by stirring the liquid to produce an upwardly moving and diverging generally conical liquid flow stream.

3. The method of claim 2 wherein the liquid is stirred at a point in the liquid which is eccentric to the center of the container.

4. The method of claim 2 wherein the plurality of fine streams of first fluid are injected into the upwardly moving and diverging conical liquid flow stream at a plurality of angularly spaced points and at an angle to the direction of stream flow.

5. The method of claim 4 in which the fine streams of volatile first liquid are injected outward and downward across the upwardly moving and diverging conical flow stream.

6. The method of claim 2 wherein the plurality of fine streams of first liquid are injected generally perpendicular to the rapid liquid flow direction from a plurality of angularly spaced orifices formed in a circular manifold to uniformly divide and disperse the first liquid in the conical flow of the second liquid.

7. The method of claim 6, further comprising the steps of draining the mixture from the container and introducing it back into the container in a direction opposed to the stirring of the second liquid.

8. The method of claim 1, comprising the steps of providing a liquid fertilizer mixture as the second liquid in the container wherein the mixture includes a reactant suitable for reacting with anhydrous liquid ammonia to produce an exothermic reaction and rapidly introducing anhydrous liquid ammonia as the first liquid into the liquid fertilizer mixture by injecting the plurality of fine streams of the anhydrous ammonia into the rapid directional liquid flow zone to achieve a sufficient temperature in the dispersion to at least partially offset the endothermic reaction produced by vaporization of the finely divided ammonia.

9. The method of claim 8, further comprising the step of mixing water and mono-ammonium phosphate in the container prior to injecting the anhydrous ammonia to produce phosphoric acid as the reactant.

10. An apparatus for uniformly mixing and dispersing a volatile first liquid in a second liquid, comprising means for containing a body of second liquid, means for creating in such body a recirculating flow pattern including a zone of rapid directional liquid flow, and means for injecting at spaced points into such zone a plurality of fine streams of the volatile first liquid to mix the same with the second liquid to produce an intimate dispersion of finely divided first liquid in the second liquid, the resulting dispersion being carried into the recirculating flow pattern to widely mix the dispersed volatile first liquid throughout the second liquid.

11. The apparatus as recited in claim 10 wherein the means for creating the recirculating flow pattern includes means positioned in the containing means for stirring the liquid to produce an upwardly diverging generally conical liquid flow stream.

12. The apparatus as recited in claim 11 wherein the means for injecting the plurality of fine streams of the volatile first liquid includes a circular manifold, a plurality of angularly spaced orifices formed in the manifold, and means for supplying the first liquid to the orifices.

13. The apparatus as recited in claim 12 wherein the manifold and stirring means are positioned eccentric to the center of the containing means.

14. The apparatus as recited in claim 13, further comprising means for draining the liquid from the containing means and recirculating the liquid back into the containing means in a direction opposed to the direction of operation of the stirring means, the draining and recirculating means including an outlet port and an inlet port in the containing means, the inlet port being positioned vertically at a point no higher than the vertical position of the stirring means in the containing means.

15. An apparatus for uniformly mixing and dispersing liquid ammonia in an acidic liquid, comprising a tank for containing the acidic liquid, an impeller positioned axially downward in the tank for stirring the acidic liquid to create a recirculating flow pattern, a circular manifold positioned axially downward in the tank in proximity to the impeller, the impeller creating a zone of rapid directional liquid flow adjacent the manifold in response to the stirring of the acidic liquid, a plurality of spaced orifices formed in the manifold for injecting a plurality of fine streams of a liquid ammonia into the flow zone to produce an intimate dispersion of finely divided liquid ammonia at spaced points in the acidic liquid, and means for supplying liquid ammonia to the manifold, the acidic liquid with the dispersed liquid ammonia being carried by the recirculating flow pattern from the flow zone to widely mix the dispersed ammonia throughout the liquid mixture.

16. The apparatus as recited in claim 15 wherein the acidic liquid includes phosphoric acid and the liquid ammonia is anhydrous ammonia.

17. The apparatus as recited in claim 15 wherein the manifold and the impeller are positioned concentrically relative to each other to produce an upwardly diverging generally conical recirculating flow pattern which includes the zone of rapid directional flow, and both are positioned eccentrically relative to the center of the tank.

18. The apparatus as recited in claim 17 wherein the impeller is generally circular, is positioned in spaced parallel relationship to the manifold, and has a diameter which is generally one-fifth the cross-sectional dimension of the tank.

19. The apparatus as recited in claim 18 wherein the impeller includes a disk having stirring tips at its periphery, and means for rotating the impeller in a predetermined direction at a tip speed of at least 5,000 feet per minute to establish the recirculating flow pattern and to establish the zone of rapid directional liquid flow at the discharge side of the impeller.

20. The apparatus as recited in claim 19, further comprising an outlet port in the tank for draining liquid mixture from the tank, an inlet port in the tank for introducing the drained liquid mixture back into the tank in a direction opposed to the predetermined direction of rotation of the impeller, and means connecting the outlet and inlet ports for circulating the liquid mixture, the inlet port being positioned in the tank to introduce the liquid mixture back into the tank at a level below the axial position of the manifold.

21. The apparatus as recited in claim 20 wherein the impeller further includes a plurality of elongated impeller vanes projecting generally at right angles to the plane of the disk and equally spaced around the disk adjacent its outer periphery, each of the vanes having its leading edge coincident with a circle concentric with the impeller and being inclined outwardly and rearwardly therefrom.

22. The apparatus as recited in claims 15 or 17 wherein the manifold is a circular ring and the orifices are formed angularly relative to the horizontal plane of the ring to inject the fine streams of the liquid ammonia generally perpendicular to the direction of liquid flow in said zone.

23. A method of uniformly mixing and dispersing fluid in a liquid, comprising the steps of providing a body of liquid in a container, stirring the liquid at a position eccentric to the center of the container to create in the body of liquid a recirculating flow pattern in the form of an upwardly diverging generally conical stream which includes a zone of rapid liquid flow, injecting into the rapid liquid flow zone from a plurality of angularly spaced orifices in a circular manifold a plurality of fine streams of a fluid to be mixed with the liquid so as to produce an intimate dispersion of finely divided fluid at spaced points in the liquid, and carrying the liquid with the dispersed fluid into the recirculating flow pattern to widely mix the dispersed fluid throughout the liquid in the container, and further comprising the steps of draining the liquid from the container and introducing the liquid back into the container in a direction opposed to the stirring of the liquid.

24. Apparatus for uniformly mixing and dispersing a fluid in a liquid, comprising means for containing a body of liquid, stirring means positioned eccentric to the center of containing means, said stirring means creating in the body of liquid a recirculating flow pattern in the form of an upwardly diverging generally conical stream which includes a zone of rapid liquid flow, injecting into the rapid liquid flow zone from a plurality of angularly spaced orifices in a cicular manifold, a plurality of fine streams of a fluid to be mixed with the liquid so as to produce an intimate dispersion of finely divided fluid at spaced points in the liquid, and carrying the liquid with the dispersed fluid into the recirculating flow pattern to widely mix the dispersed fluid throughout the liquid in the container, and further comprising means for draining the liquid from the containing means and recirculating the liquid back into the containing means in a direction opposed to the direction of operation of the stirring means, the draining and recirculating means including an outlet port and an inlet port in the containing means, the inlet port being positioned vertically at a point no higher than the vertical position of the stirring means in the containing means.

* * * * *